(12) United States Patent
Sekine (10) Patent No.: US 7,721,026 B2
(45) Date of Patent: May 18, 2010

(54) INTERFACE CONTROLLER, METHOD FOR CONTROLLING READ ACCESS, AND INFORMATION PROCESSING APPARATUS PROVIDED WITH THE INTERFACE CONTROLLER

(75) Inventor: Takuya Sekine, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/953,618

(22) Filed: Dec. 10, 2007

(65) Prior Publication Data

US 2008/0140882 A1    Jun. 12, 2008

(30) Foreign Application Priority Data

Dec. 12, 2006    (JP) .............................. 2006-334525

(51) Int. Cl.
*G06F 3/00* (2006.01)
*G06F 5/00* (2006.01)
*G06F 13/28* (2006.01)
*G06F 13/00* (2006.01)

(52) U.S. Cl. .............................. 710/57; 710/28; 710/32; 710/34; 710/59

(58) Field of Classification Search .................. 710/74, 710/28, 32, 34, 36, 57, 59
See application file for complete search history.

(56) References Cited

U.S. PATENT DOCUMENTS

| 4,860,244 | A | * | 8/1989 | Bruckert et al. | ............. 711/219 |
| 5,481,738 | A | * | 1/1996 | Bartow et al. | ............... 709/220 |
| 7,054,987 | B1 | * | 5/2006 | Reed et al. | ................... 710/310 |
| 2004/0230690 | A1 | * | 11/2004 | Teh | ............................ 709/230 |
| 2006/0218207 | A1 | * | 9/2006 | Nonaka | ...................... 707/203 |

FOREIGN PATENT DOCUMENTS

| JP | 2000174779 A | * | 6/2000 |
| JP | 2005-322308 | | 11/2005 |

* cited by examiner

*Primary Examiner*—Niketa I Patel
*Assistant Examiner*—Farley J Abad
(74) *Attorney, Agent, or Firm*—Turocy & Watson, LLP (57) ABSTRACT

An interface controller connected to a read request device which performs a read request to a storage device stored with data, includes a receiving buffer which stores a read response of said storage device with respect to the read request sent from said read request device; and a control unit which performs read request authorization to said read request device on the basis of a capacity of said receiving buffer, a read request size and a read response size.

10 Claims, 7 Drawing Sheets

FIG. 7

INTERFACE CONTROLLER, METHOD FOR CONTROLLING READ ACCESS, AND INFORMATION PROCESSING APPARATUS PROVIDED WITH THE INTERFACE CONTROLLER

CROSS-REFERENCE TO RELATED APPLICATION

This application is based upon and claims the benefit of priority from the prior Japanese Patent Application No. 2006-334525, filed on Dec. 12, 2006; the entire contents of which are incorporated herein by reference.

BACKGROUND OF THE INVENTION

The present invention relates to an interface controller which controls communication with a storage device, a method for controlling read access, and an information processing apparatus provided with the interface controller; and more particularly, relates to an interface controller which continuously issues read requests, a method for controlling read access which continuously issues read requests, and an information processing apparatus provided with the interface controller.

Peripheral component interconnect express (referred to as PCI EXPRESS™) is known as an interface which is for connecting two devices. Communication in the PCI EXPRESS™ (e.g., an interface which is for connecting two devices) is to send a packet (read request) which requires memory read and receives read response sent back from the other side device in the case when performing memory access (memory read access) for memory read which reads data stored in a memory with respect to the other side device including the memory. The received read response is stored in a receiving buffer and then sent to an upper system bus.

As a method which is for storing the read response in the receiving buffer and improving performance, there is a method in which a read request issuer (for example, a central processing unit (referred to as CPU), direct memory access (referred to as DMA), or the like) continuously issues in view of a receiving buffer size. In this case, in order not to generate overflow in the receiving buffer which receives the read response, the read request issuer needs to calculate a data sending amount in memory read access on the basis of a sideband signal which acquaints a receiving buffer size and status and to control the data sending amount.

However, when the data sending amount is calculated, a load is generated on the read request issuer. Further, a system bus is required for sending and receiving the sideband signal; and consequently, versatility as a device is reduced (Japanese Patent Application Laid-Open No. 2005-322308).

BRIEF SUMMARY OF THE INVENTION

According to the first aspect of the present invention, an interface controller connected to a read request device which performs a read request to a storage device stored with data, said interface controller comprising a receiving buffer which stores a read response of said storage device with respect to the read request sent from said read request device; and a control unit which performs read request authorization to said read request device on the basis of a capacity of said receiving buffer, a read request size and a read response size.

According to the second aspect of the present invention, a method for controlling read access which controls a read request of a read request device with respect to a storage device stored with data, said method comprising storing a read response of said storage device with respect to the read request sent from said read request device in a receiving buffer; and performing read request authorization to said read request device on the basis of a capacity of said receiving buffer, a read request size and a read response size.

According to the third aspect of the present invention, an information processing apparatus connected to a storage device which stores data, said information processing apparatus comprising a read request device which performs a read request with respect to said storage device in response to read request authorization, and an interface controller including a receiving buffer which stores a read response of said storage device with respect to said read request; and a control unit which performs the read request authorization to said read request device on the basis of a capacity of said receiving buffer, a read request size and a read response size.

DETAILED DESCRIPTION OF THE INVENTION

Embodiments according to the present invention will be described with reference to the drawings hereinafter. In addition, the following embodiment is one embodiment of the present invention; and does not limit a scope of the present invention.

Figure 1:
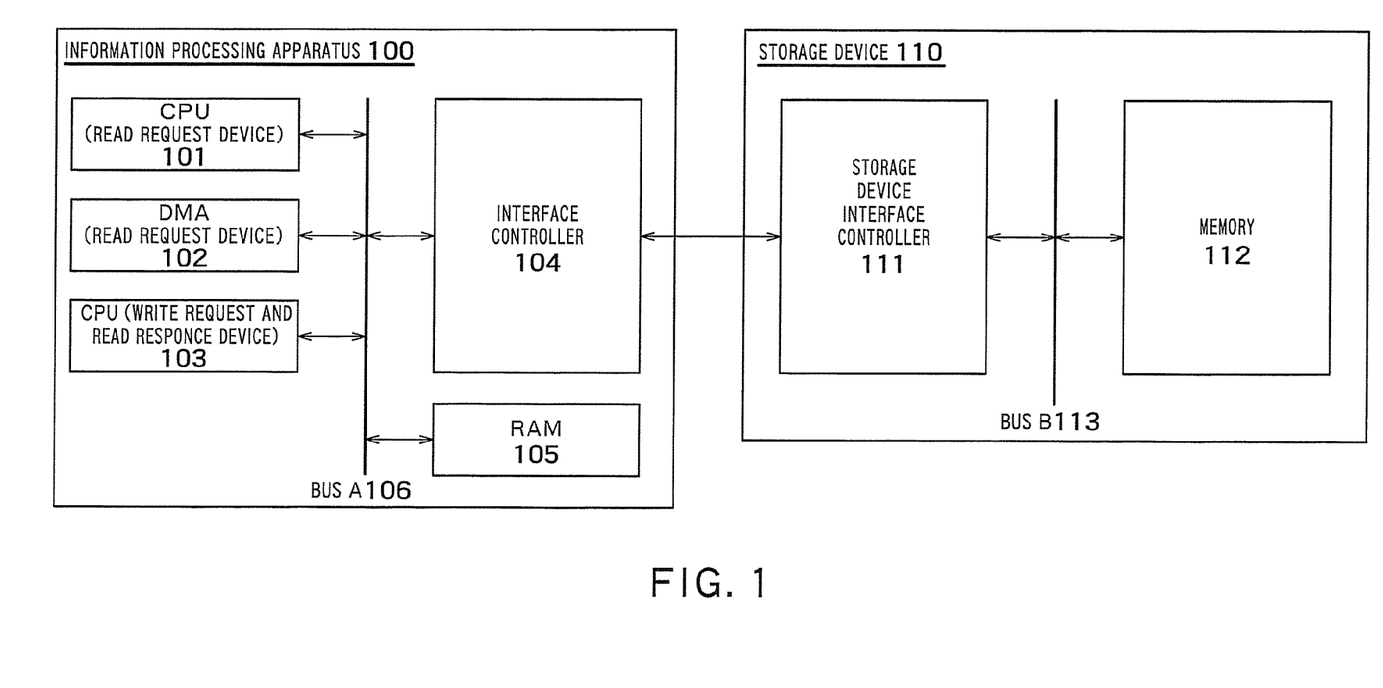
FIG. 1 is a block diagram showing a configuration of an information processing system according to an embodiment of the present invention.

FIG. 1 is a block diagram showing a configuration of an information processing system according to an embodiment of the present invention.

The information processing system according to an embodiment of the present invention includes an information processing apparatus 100 and a storage device 110, and both are connected with each other.

The information processing apparatus 100 includes a CPU 101, a DMA 102, a CPU 103, an interface controller 104, and a random access memory (referred to as RAM) 105; and these devices are mutually connected via a bus A 106. The CPU 101, the DMA 102 and the CPU 103 are devices which perform memory access (request) with respect to the storage device 110; the CPU 101 and the DMA 102 operate as a read request device; and the CPU 103 operates as a write request and read response device. The interface controller 104 controls the memory access by the CPU 101, the DMA 102 and the CPU 103. The RAM 105 stores read response sent from the storage device 110. The bus A 106 performs communication in accordance with a general purpose protocol (for example, open core protocol (referred to as OCP)). In addition, the CPU 103 may be operated as the request device with respect to the storage device 110 or as the response device with respect to requests from the storage device 110.

The storage device 110 includes a storage device interface controller 111 and a memory 112, and these devices are mutually connected via a bus B 113. The storage device interface controller 111 controls communication which is for sending responses sent from the memory 112 to the information processing apparatus 100 in accordance with a protocol of the bus B 113. For example, a storage device interface controller 111 is the controller for the PCI EXPRESS™ (e.g., an interface which is for connecting two devices). The memory 112 can store various data for use in the information processing apparatus 100; and perform reading and writing data in response to the memory access by the CPU 101, the DMA 102 and the CPU 103 in the information processing apparatus 100.

Figure 2:
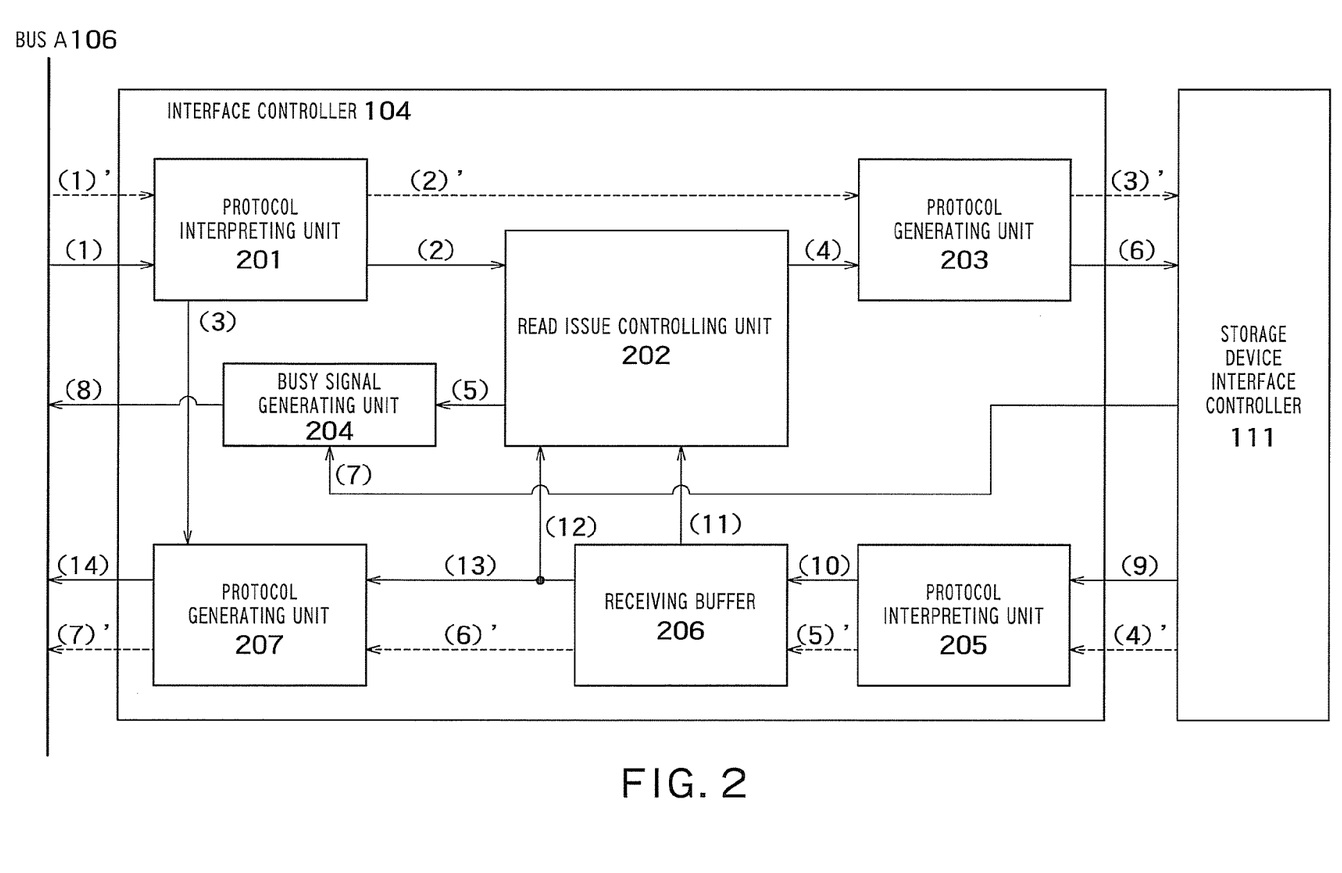
FIG. 2 is a block diagram showing an internal configuration of an interface controller 104 according to an embodiment of the present invention.

FIG. 2 is a block diagram showing an internal configuration of the interface controller 104 according to an embodiment of the present invention. In addition, solid line arrows (1) to (14) included in FIG. 2 denote data paths when a "read request" is performed by the CPU 101 or the DMA 102; dotted line arrows (1)' to (3)' denote data paths when a "write request or read response" is performed by the CPU 103; and dotted line arrows (4)' to (7)' denote data paths when a "read request or the like (read request, write request or read response) with respect to the information processing apparatus 100" is performed by the storage device 110.

The interface controller 104 according to an embodiment of the present invention includes a protocol interpreting unit A 201, a read issue control unit 202, a protocol generating unit B 203, a busy signal generating unit 204, a protocol interpreting unit B 205, a receiving buffer 206 and a protocol generating unit A 207. The protocol interpreting unit A 201 and the protocol generating unit A 207 are connected to the bus A 106. The protocol generating unit B 203 and the protocol interpreting unit B 205 are connected to the storage device interface controller 111. The busy signal generating unit 204 is connected to the bus A 106 and to the storage device interface controller 111. The respective units 201 to 207 are realized by an electric circuit (not shown in the drawing).

First, the case when the "read request" is performed by the CPU 101 or the DMA 102 will be described. (1) The protocol interpreting unit A 201 receives the read request in accordance with the protocol of the bus A 106, and interprets contents of the protocol. (2) The protocol interpreting unit A 201 appends interpreting part identification information (information which represents as to the read request is interpreted by which interpreting part of the protocol interpreting unit A 201 (see FIG. 3)) to the read request, and sends the read request to the read issue control unit 202. (3) The protocol interpreting unit A 201 sends the interpreting part identification information to the protocol generating unit A 207. (4) The read issue control unit 202 performs a read issue control process (see FIG. 7) (to be described later) with respect to the read request sent from the protocol interpreting unit A 201, and sends the read request to the protocol generating unit B 203. (5) The read issue control unit 202 appends the interpreting part identification information to a generated read busy signal, and sends the read busy signal to the busy signal generating unit 204 when the read busy signal is generated in the read issue control process. (6) The protocol generating unit B 203 receives the read request sent from the read issue control unit 202, converts to the protocol of the bus B 113, and sends the read request to the storage device interface controller 111. (7) The busy signal generating unit 204 receives a bus B busy signal representing a busy state of the bus B 113 from the storage device interface controller 111. (8) The busy signal generating unit 204 generates a busy signal with respect to the bus A 106, and sends the busy signal to the bus A 106 when receiving the read busy signal or the bus B busy signal. (9) The protocol interpreting unit B 205 receives a read response from the storage device interface controller 111 in accordance with the protocol of the bus B 113. (10) The receiving buffer 206 temporarily stores the read response sent from the protocol interpreting unit B 205. (11) The receiving buffer 206 sends a receiving buffer size (maximum capacity of receiving buffer) to the read issue control unit 202. (12) The receiving buffer 206 sends a read response size (data size of read response) to the read issue control unit 202. (13) The receiving buffer 206 sends the read response to the protocol generating unit A 207. (14) The protocol generating unit A 207 converts the read response sent from the receiving buffer 206 to the protocol of the bus A 106, and sends the read response to the bus A 106 associating with the interpreting part identification information sent from the protocol interpreting unit A 201.

Next, the case when the "write request or read response" is performed by the CPU 103 will be described. (1)' The protocol interpreting unit A 201 receives the write request or the read response in accordance with the protocol of the bus A 106, and interprets contents of the protocol. (2)' The protocol interpreting unit A 201 sends the write request or the read response to the protocol generating unit B 203 on the basis of an interpreted result. (3)' The protocol generating unit B 203 receives the write request or the read response sent from the protocol interpreting unit A 201, converts to the protocol of the bus B 113, and sends the write request or read response to the storage device interface controller 111.

Next, the case when the "read request or the like with respect to the information processing apparatus 100" is performed by the storage device 110 will be described. (4)' The protocol interpreting unit B 205 receives the read request or the like with respect to the information processing apparatus 100 from the storage device interface controller 111 in accordance with the protocol of the bus B 113. (5)' The receiving buffer 206 temporarily stores the read request or the like with respect to the information processing apparatus 100 sent from the protocol interpreting unit B 205. (6)' The receiving buffer 206 sends the read request or the like with respect to the information processing apparatus 100 to the protocol generating unit A 207. (7)' The protocol generating unit A 207 converts the read request or the like with respect to the information processing apparatus 100 sent from the receiving buffer 206 to the protocol of the bus A 106, and sends the read request or the like to the bus A 106.

In addition, a capacity of the receiving buffer 206 needs a capacity larger than a read request size (data size of the response which can require for one read request) of the bus B 113. For example, when the capacity of the receiving buffer 206 is eight times as large as the read request size, read requests of maximum eight times can be continuously issued. In addition, in embodiment of the present invention, the configuration provided with one receiving buffer 206 is described; however, a plurality of receiving buffers 206 may be provided for each interpreted result by the protocol interpreting unit B 205.

Figure 3:
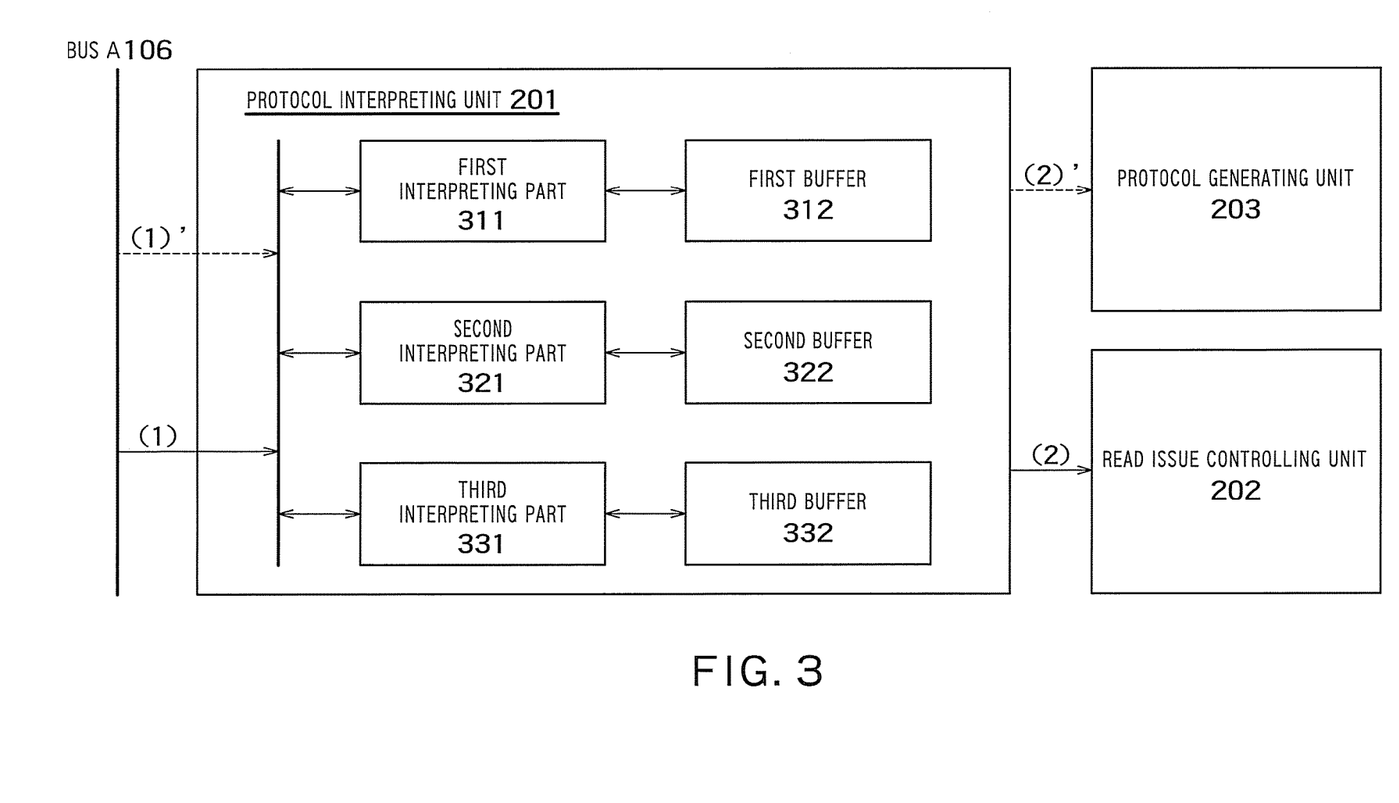
FIG. 3 is a block diagram showing an internal configuration of a protocol interpreting unit A 201 according to an embodiment of the present invention.

FIG. 3 is a block diagram showing an internal configuration of the protocol interpreting unit A 201 according to embodiment of the present invention.

The protocol interpreting unit A 201 according to an embodiment of the present invention includes a first interpreting part 311 connected to a first buffer 312, a second interpreting part 321 connected to a second buffer 322 and a third interpreting part 331 connected to a third buffer 332; and the respective interpreting parts 311 to 331 are connected to the bus A 106. The respective interpreting parts 311 to 331 are realized by an electric circuit (not shown in the drawing).

The first interpreting part 311 to the third interpreting part 331 are provided for each issue source of the request or the response sent via the bus A 106. In embodiment of the present invention, the first interpreting part 311 interprets a protocol of the request issued by the CPU 101; the second interpreting part 321 interprets a protocol of the request issued by the DMA 102; and the third interpreting part 331 interprets a protocol of the request or the response issued by the CPU 103.

The first interpreting part 311 receives the read request issued by the CPU 101 via the bus A 106, stores the read request in the first buffer 312, and interprets the protocol. In addition, the read request stored in the first buffer 312 is continued to be kept till the read request is sent to the read issue control unit 202. The second interpreting part 321 and the second buffer 322, and the third interpreting part 331 and the third buffer 332 are the same as the first interpreting part 311 and the first buffer 312; and therefore, their description will be omitted.

Figure 4:
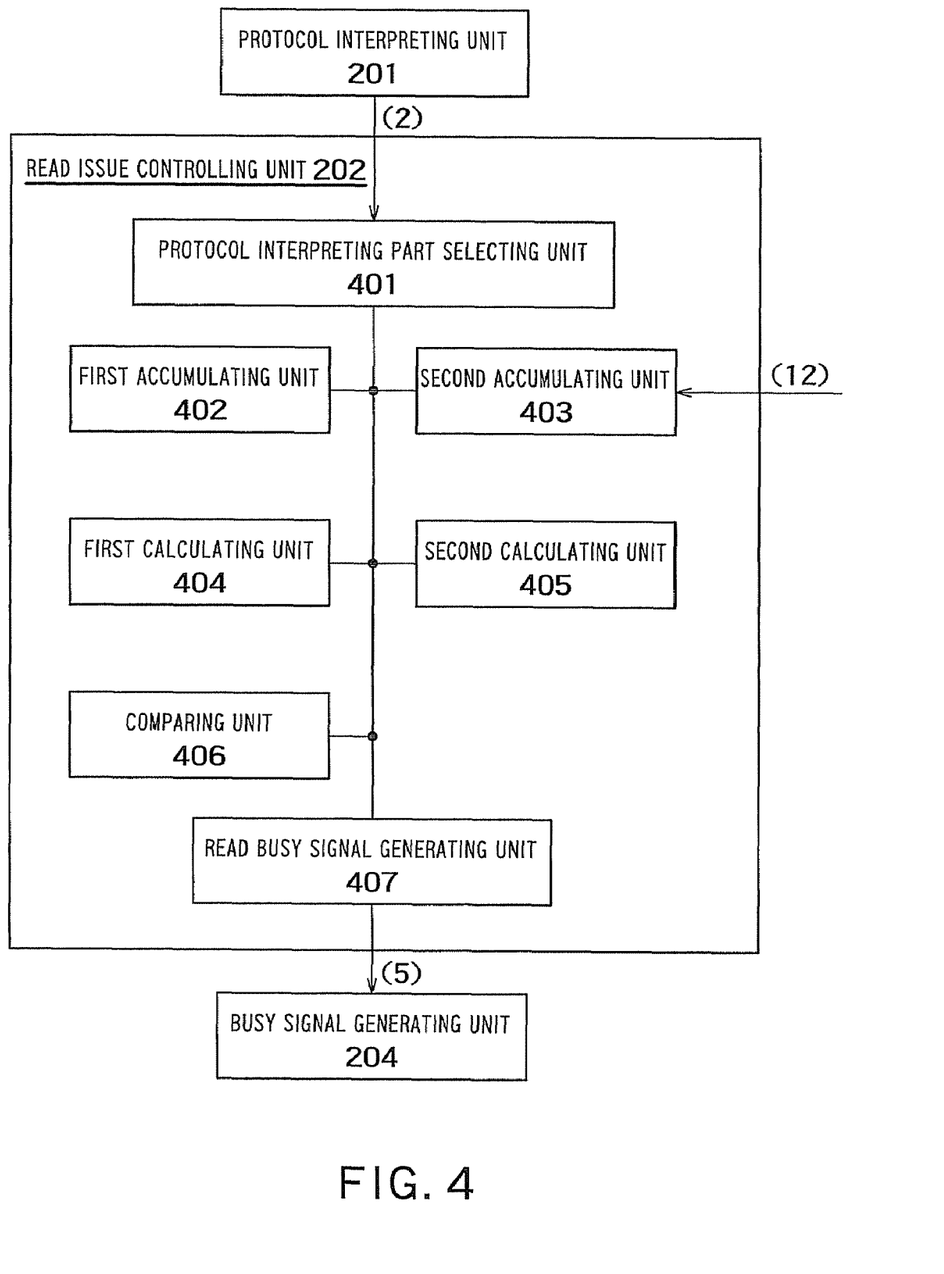
FIG. 4 is a block diagram showing an internal configuration of a read issue control unit 202 according to an embodiment of the present invention.

FIG. 4 is a block diagram showing an internal configuration of the read issue control unit 202 according to embodiment of the present invention.

The read issue control unit 202 according to an embodiment of the present invention includes a selecting unit of a protocol interpreting part 401, a first accumulating unit 402, a second accumulating unit 403, a first calculating unit 404, a second calculating unit 405, a comparing unit 406 and a read busy signal generating unit 407. The respective units 401 to 407 are realized by an electric circuit (not shown in the drawing).

The selecting unit of the protocol interpreting part 401 selects an protocol interpreting part to be an object of the read issue control process on the basis of a predetermined priority order when a plurality of the requests are sent in parallel from the first interpreting part 311, the second interpreting part 321, and the third interpreting part 331 of the protocol interpreting unit A 201. The priority order is determined by, for example, a round-robin fashion (fashion which changes the priority order of the first interpreting part 311 to the third interpreting part 331 with time) or a fixing fashion (fashion based on a predetermined priority order).

The first accumulating unit 402 accumulates a total value (m2) of a read request size of the read request in which the read issue has been completed. The second accumulating unit 403 accumulates a total value (n1) of a read response size of the read response in which the response process has been completed.

The first calculating unit 404 calculates the sum (M (=m1+m2)) of a read request size (m1) of the read request of the interpreting part selected by the selecting unit of the protocol interpreting part 401 and the total value (m2) of the read request size accumulateed in the first accumulating unit 402. The second calculating unit 405 calculates the sum (N (=n1+n2)) of the total value (n1) of the read response size accumulateed in the second accumulating unit 403 and a receiving buffer size (n2) sent from the receiving buffer 206.

The comparing unit 406 compares magnitude relation between the calculated result (M) of the first calculating unit 402 and the calculated result (N) of the second calculating unit 405. The read busy signal generating unit 407 generates the read busy signal and sends the busy signal to the busy signal generating unit 204 when a compared result of the comparing unit 406 is M>N.

Figure 5:
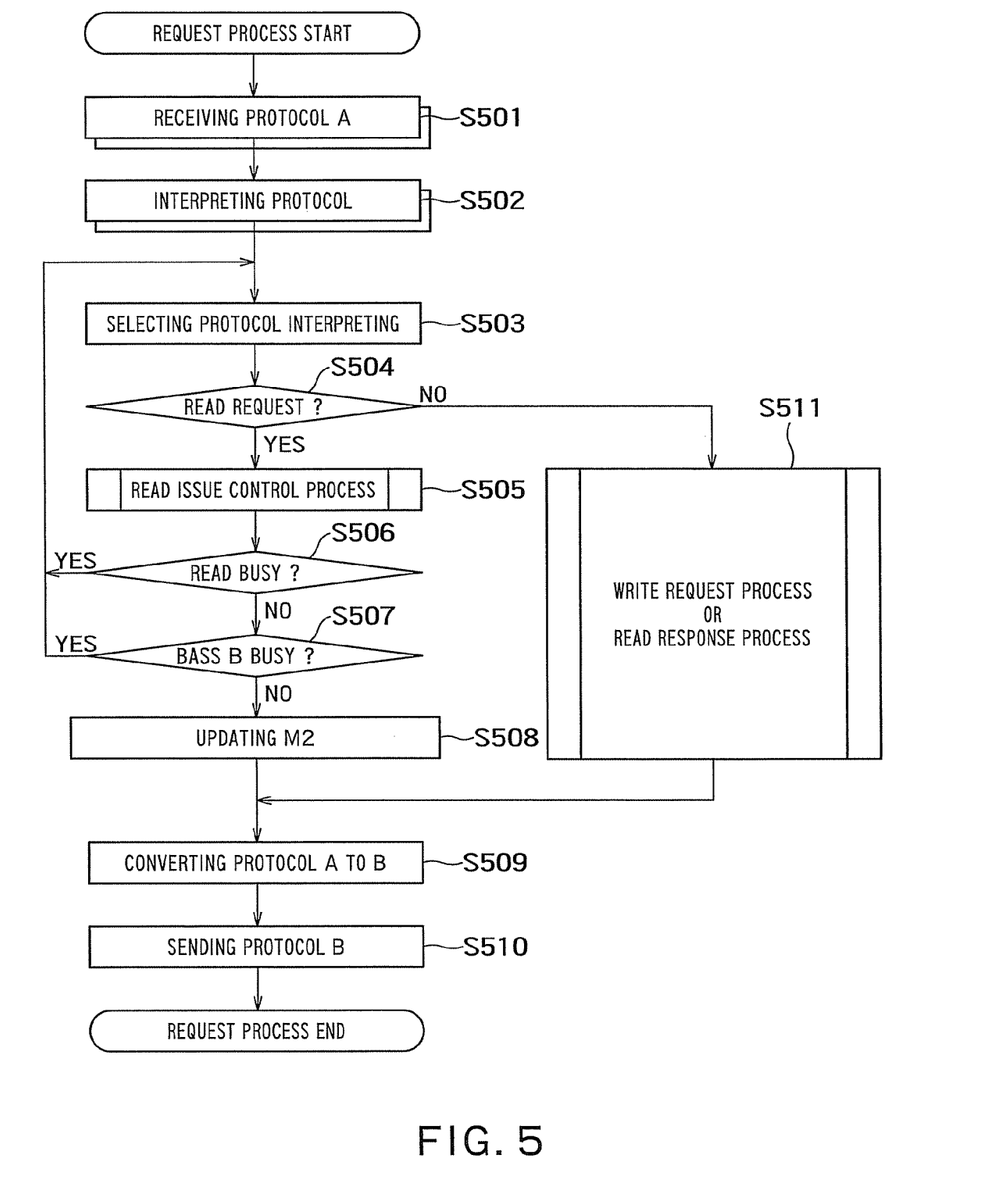
FIG. 5 is a flow chart showing a processing procedure in a request process of the interface controller 104 according to an embodiment of the present invention.

FIG. 5 is a flow chart showing a processing procedure in the request process of the interface controller 104 according to embodiment of the present invention.

First, the interface controller 104 according to embodiment of the present invention receives the request in accordance with the protocol of the bus A 106 (S501). Next, contents of the protocol of the received request are interpreted (S502). In addition, steps S501 and S502 are performed in parallel by the respective interpreting parts 311 to 331.

Next, the interpreting part to be processed (any one of the first interpreting part 311 to the third interpreting part 331) is selected on the basis of the predetermined priority order (S503). Next, when an interpreted result of the interpreting part selected in step S503 is the "read request" (S504-Yes), the "read issue control process (FIG. 7)" (to be described later) is performed (S505). Next, the process returns to step S503 when the read busy signal is generated (S505-Yes), or when the bus B busy signal is sent from the storage device interface controller 111 (S506-Yes).

Meanwhile, when both the read busy signal and the bus B busy signal are absent (S506-No and S507-No), a read request size of the read request in which the read issue control process is performed in step S505 is added to the value of m2 (issued read request size) to update (S508). Next, the read request of the interpreting part selected in step S503 is converted to the protocol of the bus B 113 (S509). Next, the read request is sent to the storage device interface controller 111 in accordance with the protocol of the bus B 113 (S510).

On the other hand, when the interpreted result of the interpreting part selected in step S503 is the "write request or read response" (S504-No), a write request process or a read response process with respect to from the bus A 106 to the bus B 113 is performed (S511). A description of the write request process or the read response process will be omitted. Next, the write request or the read response processed in step S511 is converted to the protocol of the bus B 113 (S509). Next, the write request or the read response is sent to the storage device interface controller 111 in accordance with the protocol of the bus B 113 (S510).

Figure 6:
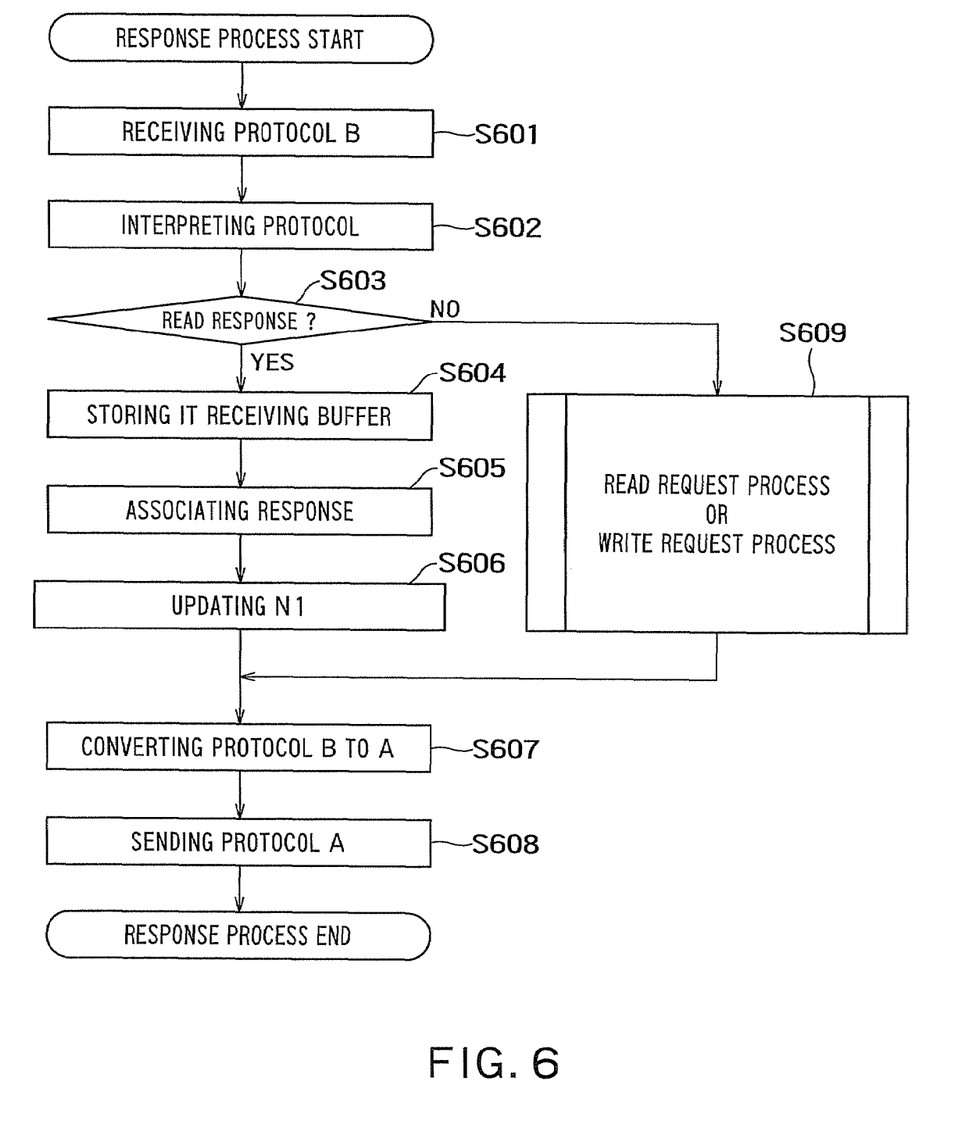
FIG. 6 is a flow chart showing a processing procedure in a response process of the interface controller 104 according to an embodiment of the present invention.

FIG. 6 is a flow chart showing a processing procedure in the response process of the interface controller 104 according to embodiment of the present invention. In addition, the response process is a process with respect to the request performed by the CPU 101, the DMA 102 or the CPU 103.

First, the interface controller 104 according to embodiment of the present invention receives the response in accordance with the protocol of the bus B 113 (S601). Next, contents of the protocol of the received response are interpreted (S602).

Next, when an interpreted result in step S602 is the "read response" (S603-Yes), the read response is stored in the receiving buffer 206 (S604). Next, the interpreting part identification information of the interpreting part selected in step S503 shown in FIG. 5 is associated with the read response stored in the receiving buffer 206 (S605). Next, the read response size of the read response associated in step S605 is added to the total value (n2) of the read response size accumulateed in the second accumulating unit 302 to update (S606). Next, the read response stored in the receiving buffer 206 in step S604 is converted to the protocol of the bus A 106 (S607). Next, the read response is sent to the bus A 106 in accordance with the protocol of the bus A 106 (S608).

Meanwhile, when the interpreted result in step S602 is the "read request or the write request" (S603-No), the read request process or the write request process with respect to from the bus B 113 to the bus A 106 is performed (S609). A description of the read request process or the write request process will be omitted. Next, the read request or the write request processed in step S609 is converted to the protocol of the bus A 106 (S607). Next, the read request or the write request is sent to the bus A 106 in accordance with the protocol of the bus A 106 (S608).

Figure 7:
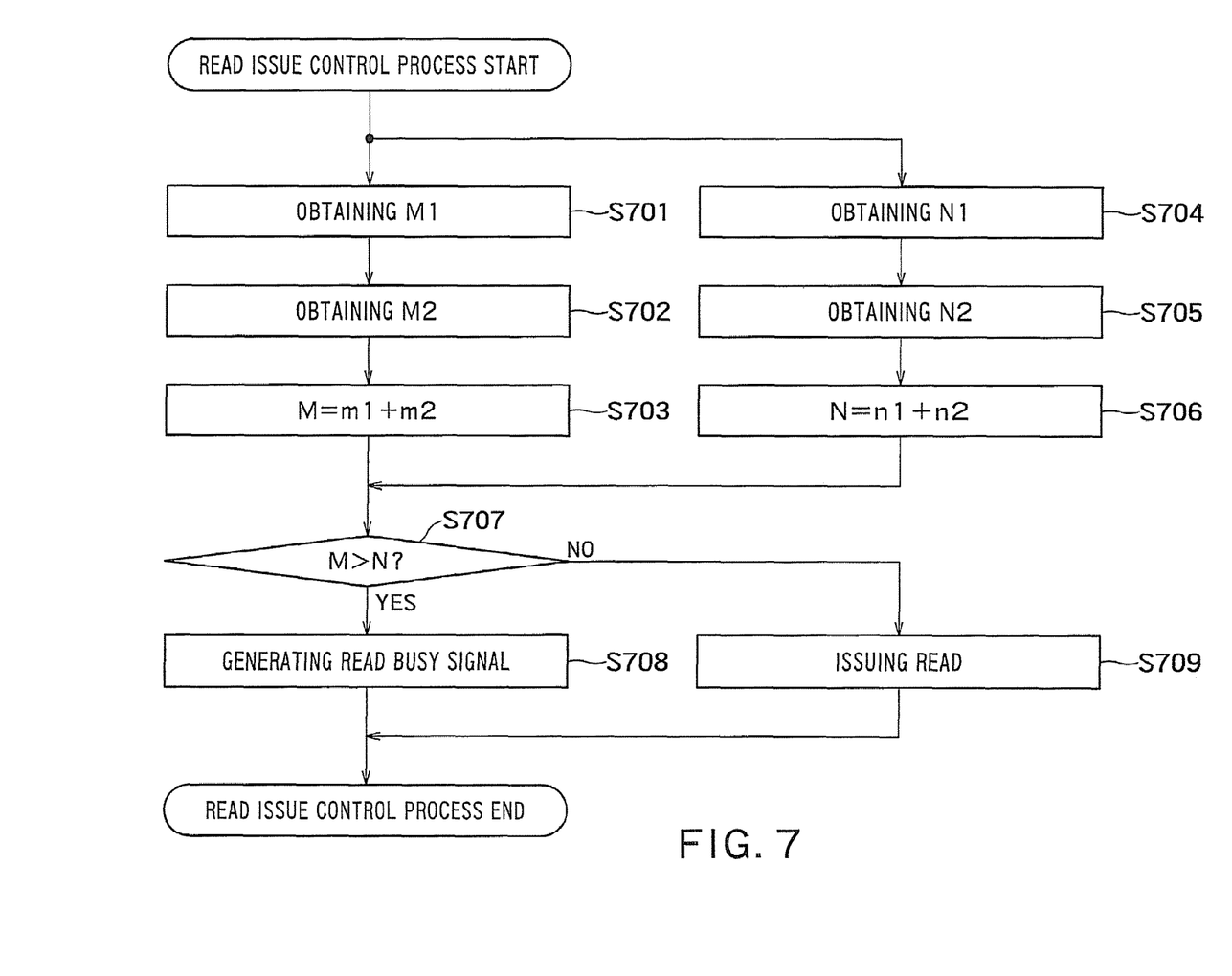
FIG. 7 is a flow chart showing a processing procedure in a read issue control process (S505 shown in FIG. 5) of the read issue control unit 202 according to an embodiment of the present invention.

FIG. 7 is a flow chart showing a processing procedure in the read issue control process of the read issue control unit 202 (S505 shown in FIG. 5) according to embodiment of the present invention.

First, the read issue control unit 202 according to embodiment of the present invention obtains the read request size (m1) of the interpreting part selected in step S503 (S701). Next, the total value (m2) of the read request size accumulateed in the first accumulating unit 402 is obtained (S702). Next, M (=m1+m2) is calculated (S703).

Furthermore, the total value (n1) of the read response size accumulateed in the second accumulating unit 403 is obtained (S704). Next, the receiving buffer size (n2) of the receiving buffer 206 is obtained (S705). Next, N (=n1+n2) is calculated (S706).

Next, magnitude relation between M and N is compared (S707). If the relation is M>N (S707-Yes), the read busy signal is generated, and it is sent to the busy signal generating unit 204 (S708). Meanwhile, the relation is M<N (S707-No), read issue is performed, and the read request is sent to the protocol generating unit B 203 (S709).

According to of the present invention, only when the relation is M≦N the read issue is performed (S 709); and therefore, overflow is not occurred in the receiving buffer 206. Therefore, the CPU 101 and the DMA 102 can continuously issue the read request without occurring the overflow in the receiving buffer 206.

In addition, the CPU 101 and the DMA 102 issue the read request on the basis of a state whether or not the busy signal is generated by the busy signal generating unit 204 (that is, whether or not the bus A is in a busy state). That is, when the bus A is not in the busy state, the CPU 101 and the DMA 102 issue the read request without calculating the read request size. Therefore, the CPU 101 and the DMA 102 do not need to perform a process for calculating the read request size; and consequently, an extra load is not occurred.

What is claimed is:

1. An interface controller connected to a read request device configured to perform a read request to a storage device configured to store data, comprising:

a receiving buffer configured to store a read response of the storage device with respect to the read request sent from the read request device;

a control unit comprising a first accumulating unit configured to store a total value of a read request size of an issued read request, a second accumulating unit configured to store a total value of a read response size of a processed read response, a first calculating unit configured to add a read request size of the read request sent from the read request device to the total value stored in the first accumulating unit to acquire a first calculated result, a second calculating unit configured to add the capacity of the receiving buffer to the total value stored in the second accumulating unit to acquire a second calculated result, and a comparing unit configured to compare the first calculated result with the second calculated result, the control unit performing a read request authorization to the read request device when the first calculated result is smaller than the second calculated result; and a protocol interpreting unit configured to interpret contents of a protocol of the read request sent from the read request device, append interpreting part identification information to the read request, and send the read request with the interpreting part identification information to the control unit.

2. The interface controller according to claim 1, wherein the control unit further comprises a busy signal generating unit configured to generate a busy signal with respect to the read request device when the first calculated result is larger than the second calculated result.

3. The interface controller according to claim 1, wherein the protocol interpreting unit comprises a buffer configured to temporarily store the read request sent from the read request device, and a processor configured to interpret the contents of the protocol of the read request stored in the buffer.

4. The interface controller according to claim 3, wherein the control unit performs the read request authorization to the read request device after the protocol interpreting unit has interpreted the contents of the protocol of the read request.

5. A read access control method for controlling a read request of a read request device with respect to a storage device storing data, the method comprising:

storing a read response of the storage device with respect to the read request sent from the read request device in a receiving buffer;

storing a total value of a read request size of an issued read request;

storing a total value of a read response size of a processed read response;

adding a read request size of the read request sent from the read request device to the total value of the read request size of the issued read request to acquire a first calculated result;

adding a capacity of the receiving buffer to the total value of the read response size of the processed read response to acquire a second calculated result;

comparing the first calculated result with the second calculated result;

performing a read request authorization to the read request device when the first calculated result is smaller than the second calculated result; and interpreting contents of a protocol of the read request sent from the read request device;

appending interpreting part identification information to the read request; and sending the read request with the interpreting part identification information.

6. The method according to claim 5, wherein in performing a busy signal with respect to the read request device is generated when the first calculated result is larger than the second calculated result.

7. An information processing apparatus connected to a storage device storing data, the information processing apparatus comprising:

a read request device configured to perform a read request with respect to the storage device in response to read request authorization;

an interface controller comprising a receiving buffer configured to store a read response of the storage device with respect to the read request, and a control unit configured to perform the read request authorization to the read request device, wherein the control unit comprises a first accumulating unit configured to store a total value of a read request size of an issued read request, a second accumulating unit configured to store a total value of a read response size of a processed read response, a first calculating unit configured to add a read request size of the read request sent from the read request device to the total value stored in the first accumulating unit to acquire a first calculated result, a second calculating unit configured to add the capacity of the receiving buffer to the total value stored in the second accumulating unit to acquire a second calculated result, and a comparing unit configured to compare the first calculated result with the second calculated result, the control unit performing a read request authorization to the read request device when the first calculated result is smaller than the second calculated result; and the interface controller further comprises a protocol interpreting unit configured to interpret contents of a protocol of the read request sent from the read request device, append interpreting part identification information to the read request, and send the read request with the interpreting part identification information to the control unit.

8. The information processing apparatus according to claim 7, wherein the control unit further comprises a busy signal generating unit configured to generate a busy signal with respect to the read request device when the first calculated result is larger than the second calculated result.

9. The information processing apparatus according to claim 7, wherein the protocol interpreting unit comprises a buffer configured to temporarily store the read request sent from the read request device, and a processor configured to interpret the contents of the protocol of the read request stored in the buffer.

10. The information processing apparatus according to claim 9, wherein the control unit performs the read request authorization to the read request device after the protocol interpreting unit interprets the contents of the protocol of the read request.

* * * * *